US010266174B2

(12) United States Patent
Shiraishi et al.

(10) Patent No.: US 10,266,174 B2
(45) Date of Patent: Apr. 23, 2019

(54) TRAVEL CONTROL DEVICE FOR VEHICLE

(71) Applicant: SUBARU CORPORATION, Tokyo (JP)

(72) Inventors: Eiichi Shiraishi, Tokyo (JP); Takayuki Nagase, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 16 days.

(21) Appl. No.: 15/497,532

(22) Filed: Apr. 26, 2017

(65) Prior Publication Data
US 2017/0313304 A1 Nov. 2, 2017

(30) Foreign Application Priority Data

Apr. 27, 2016 (JP) .................. 2016-089169

(51) Int. Cl.
B60W 30/045 (2012.01)
B60W 10/18 (2012.01)
(Continued)

(52) U.S. Cl.
CPC .......... *B60W 30/045* (2013.01); *B60W 10/06* (2013.01); *B60W 10/18* (2013.01);
(Continued)

(58) Field of Classification Search
CPC .... B60W 30/045; B60W 10/06; B60W 30/04; B60W 30/02; B60W 40/114; B60W 40/068; B60W 40/112; B60W 10/20; B60W 10/18; B60W 2550/408; B60W 2030/043; B60W 2550/14; B60W 2520/14; B60W 2710/20; B60W 2540/10; B60W 2520/18; B60W 2550/148; B60W 2710/18; B60W 2520/125; B60W 2540/18; G01C 21/26; G01S 19/13
See application file for complete search history.

(56) References Cited

U.S. PATENT DOCUMENTS 5,485,378 A * 1/1996 Franke ................. B62D 15/025
348/118
2012/0283907 A1* 11/2012 Lee ..................... B60T 8/17557
701/31.9

FOREIGN PATENT DOCUMENTS

JP H10-44954 A 2/1998
JP 2006-298210 A 11/2006

* cited by examiner

Primary Examiner — Nga X Nguyen
(74) Attorney, Agent, or Firm — McDermott Will & Emery LLP

(57) ABSTRACT

A travel control device for a vehicle executes a self-driving control based on traveling environment information on which the vehicle travels and traveling information on the vehicle. In the device, a traveling environment information acquisition unit acquires the traveling environment information. A traveling information detection unit detects the traveling information. An unstable behavior detector detects an unstable behavior in one or both of a rolling direction and a yaw direction of the vehicle. A steering wheel holding state detector detects a state in which a driver holds a steering wheel. The first unstable behavior reducer reduces the detected unstable behavior by correcting a steering angle. A second unstable behavior reducer reduces the detected unstable behavior by selecting a predetermined wheel and applying a braking force to the wheel. A vehicle behavior controller freely operates the unstable behavior reducers according to detection results.

10 Claims, 13 Drawing Sheets

(51) Int. Cl.
*B60W 10/20* (2006.01)
*B60W 40/068* (2012.01)
*B60W 40/112* (2012.01)
*B60W 40/114* (2012.01)
*G01C 21/26* (2006.01)
*G01S 19/13* (2010.01)
*B60W 10/06* (2006.01)
*B60W 30/02* (2012.01)
*B60W 30/04* (2006.01)

(52) U.S. Cl.
CPC ............ *B60W 10/20* (2013.01); *B60W 30/02* (2013.01); *B60W 30/04* (2013.01); *B60W 40/068* (2013.01); *B60W 40/112* (2013.01); *B60W 40/114* (2013.01); *B60W 2030/043* (2013.01); *B60W 2520/125* (2013.01); *B60W 2520/14* (2013.01); *B60W 2520/18* (2013.01); *B60W 2540/10* (2013.01); *B60W 2540/18* (2013.01); *B60W 2550/14* (2013.01); *B60W 2550/148* (2013.01); *B60W 2550/408* (2013.01); *B60W 2710/18* (2013.01); *B60W 2710/20* (2013.01); *G01C 21/26* (2013.01); *G01S 19/13* (2013.01)

TRAVEL CONTROL DEVICE FOR VEHICLE

CROSS-REFERENCE TO RELATED APPLICATIONS

The present application claims priority from Japanese Patent Application No. 2016-089169 filed on Apr. 27, 2016, the entire contents of which are hereby incorporated by reference.

BACKGROUND

1. Technical Field

The present invention relates to a travel control device for a vehicle that appropriately reduces an unstable behavior in a rolling direction and a yaw direction in a vehicle having a self-driving function.

2. Related Art

Up to now, in vehicles, various techniques for reducing unstable behaviors in a rolling direction and a yaw direction have been developed and put to practical use. For example, Japanese Unexamined Patent Application Publication No. 2006-298210 (hereinafter referred to as Patent Literature 1) discloses a technique associated with a vehicle rolling motion stabilization control device which acquires a lateral acceleration representing a rolling motion, acquires a steering angular velocity representing the rolling motion, determines a rolling increase trend based on characteristics including the steering angular velocity, and reduces the rolling increase trend under a braking force control or a driving force control based on the lateral acceleration when it is determined that the vehicle has the rolling increase trend. In addition, for example, Japanese Unexamined Patent Application Publication No. H10-44954 (hereinafter referred to as Patent Literature 2) discloses a technique associated with a vehicle turning control device which calculates a reference yaw rate acting on a vehicle based on a vehicle speed and a steering angle, detects an actual yaw rate acting on the vehicle, calculates an estimated yaw rate based on a lateral acceleration, performs a turning control of the vehicle based on the reference yaw rate and the actual yaw rate, and stops the turning control based on a deviation between the actual yaw rate and the estimated yaw rate.

Incidentally, the techniques disclosed in Patent Literatures 1 and 2 described above are merely intended to support driving of a driver, and in order to reduce the unstable behaviors in the rolling direction and the yaw direction of the vehicle, naturally, when the driver operates a steering wheel to correct the vehicle behaviors, the vehicle behaviors can be more appropriately stabilized. In recent years, a self-driving function has been developed and put to practical use for the purpose of improving the safety and usability of the vehicle, but also in the self-driving, similarly, when the steering of the steering wheel is controlled to reduce the unstable behaviors, the vehicle behaviors can be more appropriately stabilized. However, in the vehicle having the self-driving function, the driver may be operating the steering wheel, and when the stability of the vehicle behaviors are intended to be improved under the steering control in a situation where the driver is steering, there is a possibility that the driver's steering interferes with the steering control of the self-driving function, and instead, the driver may feel uncomfortable.

SUMMARY OF THE INVENTION

It is desirable to provide a travel control device for a vehicle for use in a vehicle equipped with a self-driving function, which is capable of performing driving assistance so as to reduce unstable behaviors in a rolling direction and a yaw direction of the vehicle without causing a driver to feel uncomfortable when the driver is steering, and quickly reducing the unstable behaviors of the vehicle while operating an optimum actuator for reducing the unstable behaviors when the driver is not steering.

An aspect of the present invention provides a travel control device for a vehicle. The travel control device is configured to execute a self-driving control based on traveling environment information on which the vehicle travels and traveling information on the vehicle. The travel control device includes a traveling environment information acquisition unit, a traveling information detection unit, an unstable behavior detector, a steering wheel holding state detector, a first unstable behavior reducer, a second unstable behavior, and a vehicle behavior controller. The traveling environment information acquisition unit is configured to acquire the traveling environment information. The traveling information detection unit is configured to detect the traveling information. The unstable behavior detector is configured to detect an unstable behavior in either one or both of a rolling direction and a yaw direction of the vehicle. The steering wheel holding state detector is configured to detect a state in which a driver holds a steering wheel. The first unstable behavior reducer is configured to reduce the detected unstable behavior of the vehicle by correcting a steering angle. The second unstable behavior reducer is configured to reduce the detected unstable behavior of the vehicle by selecting a predetermined wheel and applying a braking force to the selected wheel. The vehicle behavior controller is configured to freely operate the first unstable behavior reducer and the second unstable behavior reducer according to detection results of the unstable behavior of the vehicle and the steering wheel holding state of the driver.

BRIEF DESCRIPTION OF THE DRAWINGS

FIGS. 10A and 10B are graphs illustrating instances of characteristics of a rolling correction yaw rate change sensitive gain according to the example of the present invention, in which FIG. 10A illustrates the instance of the characteristic of the rolling correction yaw rate change sensitive gain in the case of left steering and FIG. 10B illustrates the instance of the characteristic of the rolling correction yaw rate change sensitive gain in the case of the right steering.

FIGS. 11A and 11B are graphs illustrating instances of characteristics of a rolling correction lane lateral position gain according to the example of the present invention, in which FIG. 11A illustrates the instance of the characteristic of the rolling correction lane lateral position gain in the case of left steering and FIG. 11B illustrates the instance of the characteristic of the rolling correction lane lateral position gain in the case of the right steering.

FIGS. 12A to 12C are illustrative diagrams of a lane condition rolling correction gain according to the example of the present invention, in which FIG. 12A is the diagram illustrating an instance of a characteristic of a lane condition rolling correction gain, FIG. 12B is the illustrative diagram of a lane concave portion, and FIG. 12C is the illustrative diagram of a lane convex portion.

DETAILED DESCRIPTION

Hereinafter, an example according to the present invention will be described with reference to the drawings.

Figure 1:
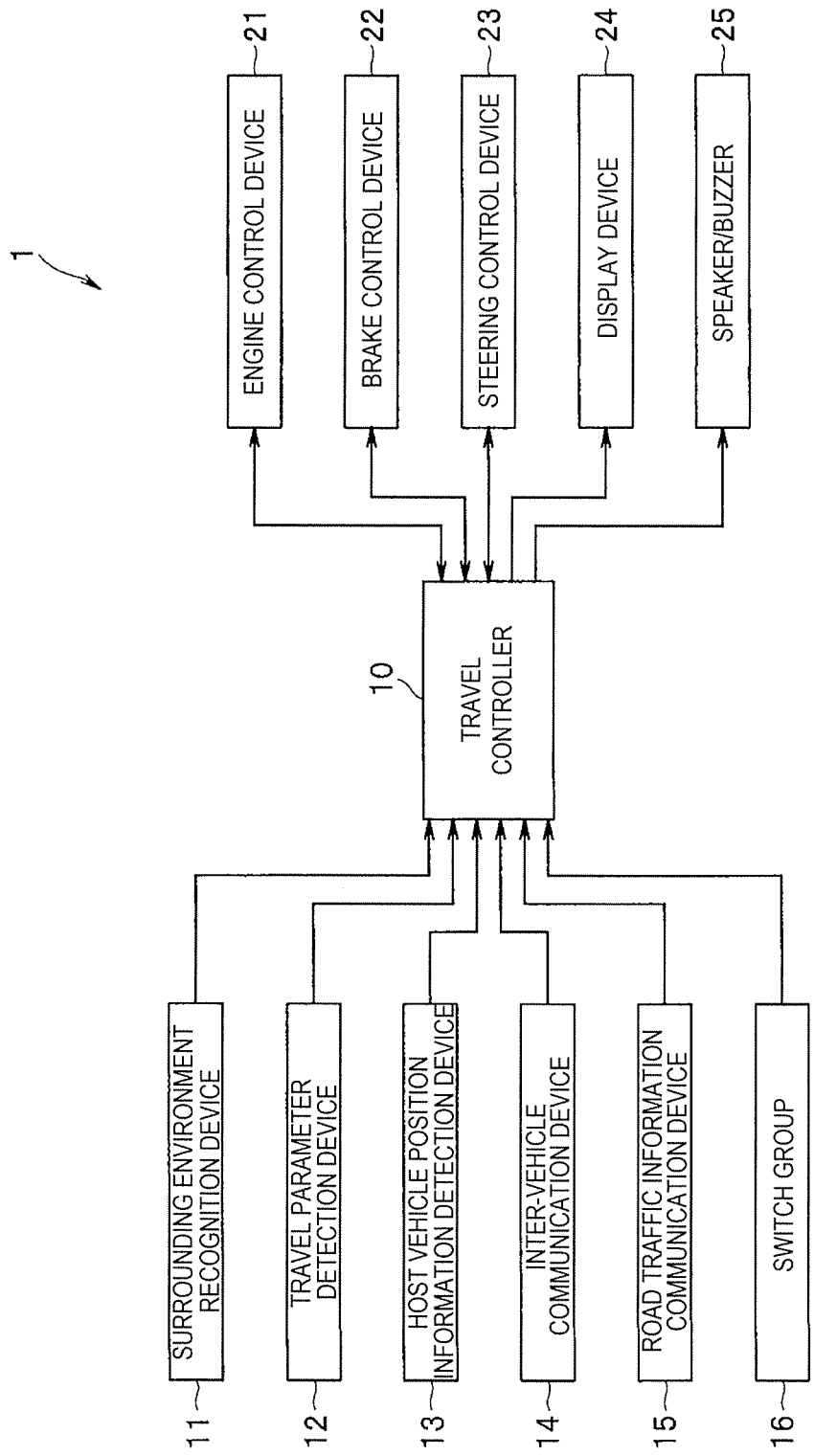
FIG. 1 is an overall configuration diagram of a travel control device for a vehicle according to an example of the present invention.

Referring to FIG. 1, reference numeral 1 represents a travel control device that is mounted on a vehicle. In the travel control device 1, various input devices such as a surrounding environment recognition device 11, a travel parameter detection device 12, a vehicle position information detection device 13, an inter-vehicle communication device 14, a road traffic information communication device 15, and a switch group 16 are connected to a travel controller 10. In addition, various output devices such as an engine control device 21, a brake control device 22, a steering control device 23, a display device 24, and a speaker/buzzer 25 are coupled to the travel controller 10.

The surrounding environment recognition device 11 is configured to include a camera device (stereo camera, monocular camera, color camera, and the like) including a solid-state imaging device disposed in a vehicle cabin, which acquires image information by imaging an external environment of a vehicle, a radar device (laser radar, millimeter-wave radar, and the like) which receives a reflected wave from a three-dimensional object present around the vehicle, a sonar, and the like (hitherto, not illustrated).

For instance, based on the image information captured by the camera device, the surrounding environment recognition device 11 performs a known grouping process on distance information, and compares the distance information subjected to the grouping process with preset three-dimensional road shape data or three-dimensional object data. In this manner, based on lane marking line data, side wall data relating to guardrails or curbstones present along a road, and three-dimensional object (obstacle) data relating to other vehicles (preceding vehicle, oncoming vehicle, side-by-side vehicle, parking vehicle) or the like, the surrounding environment recognition device 11 extracts a relative position (distance and angle) from the vehicle together with a speed. In the lane marking line data, a shape of the lane marking line, a lane width, vehicle position data in a lane width direction, ruggedness information of the lane in a longitudinal direction of the vehicle (refer to FIGS. 12B and 12C), and the like are extracted.

In addition, based on reflected wave information acquired by the radar device, the surrounding environment recognition device 11 detects a position (distance and angle) of the wave reflected three-dimensional object together with the speed. In one example, the surrounding environment recognition device 11 may serve as a "traveling environment information acquisition unit".

The travel parameter detection device 12 detects travel information of the vehicle. Specifically, the travel information includes a vehicle speed (including a wheel speed of each wheel), a longitudinal acceleration, a lateral acceleration, a steering torque, a steering angle, a front right suspension stroke, a front left suspension stroke, a yaw rate, an accelerator position, a throttle position, a road surface gradient of a travel road surface, an estimated value of a road surface friction coefficient, ON-OFF of a brake pedal switch, ON-OFF of an accelerator pedal switch, ON-OFF of a turn signal switch, ON-OFF of a hazard lamp switch, and the like. In one example, the travel parameter detection device 12 may serve as a "travel information detection unit".

For instance, the vehicle position information detection device 13 may be a known navigation system. For instance, the vehicle position information detection device 13 receives a radio wave transmitted from a global positioning system (GPS) satellite, and detects the current position, based on the radio wave information and self-contained navigation information using a vehicle speed signal obtained from an acceleration sensor, a gyro, and the rotation of the tire. The vehicle position information detection device 13 identifies a vehicle position on map data stored in advance in a flash memory, a compact disc (CD), a digital versatile disc (DVD), a Blu-ray (registered trademark) disc, a hard disk drive (HDD), and the like.

As the map data stored in advance, the vehicle position information detection device 13 has road data and facility data. The road data includes position information and type information of a link, position information and type information of a node, curve curvature (curve radius) information, and information relating to a connection relationship between the node and the link, that is, intersection information, road branch and junction information, and the maximum vehicle speed information in a branch road. The facility data has multiple records for each facility. Each record has data indicating name information, location information, and facility type (each type of department stores, shops, restaurants, parking lots, parks, and repair bases for vehicle's malfunctions) information of a target facility. Then, the vehicle position on the map position is displayed. If a destination is input by an operator, a route from a starting place to the destination is calculated in a predetermined manner. The route is displayed in the display device 24 such as a display or a monitor. Alternatively, the speaker/buzzer 25 performs voice guidance so as to freely guide the route. In one example, the vehicle position information detection device 13 may serve as a "traveling environment information acquisition unit".

For instance, the inter-vehicle communication device 14 is configured to include a short range wireless communication device having a communication area of approximately 100 m such as a wireless LAN. The inter-vehicle communication device 14 directly communicates with other vehicles without a server intervening therebetween, and can transmit and receive information. Then, through mutual communication with other vehicles, vehicle information, travel information, and traffic environment information are exchanged therebetween. The vehicle information includes specific information indicating vehicle types (in the present example, vehicle models such as passenger vehicles, trucks, or two-wheeled vehicles). In addition, the travel information includes vehicle speed and position information, lighting information of a brake lamp, flashing information sent by a direction indicator at the time of right turn and left turn, flashing information of a hazard lamp flashing at the time of emergency stop. Furthermore, the traffic environment information includes road traffic jam information and information varying depending on a situation such as construction information. In one example, the inter-vehicle communication device 14 may serve as a "traveling environment information acquisition unit".

The road traffic information communication device 15 is a so-called vehicle information and communication system (VICS: registered trademark), and is a device which receives real time road traffic information relating to traffic jams, accidents, construction work, a required time, and parking lots through FM multiplex broadcasting or from a transmitter on the road, and which displays the received traffic information on the above-described map data stored in advance. In one example, the road traffic information communication device 15 may serve as a "traveling environment information acquisition unit".

The switch group 16 is a switch group relating to driving support control for drivers. For instance, the switch group 16 is configured to include a switch for travel control at a preset fixed speed, a switch for control the vehicle to travel to follow a preceding vehicle while an inter-vehicle distance from the preceding vehicle and an inter-vehicle time are maintained to a preset fixed value, a switch for lane keeping control to control the vehicle to keep the lane by maintaining a travel lane to a set lane, a switch for lane deviation preventing control to prevent the vehicle from deviating from the travel lane, a switch for overtaking control permission switch to permit the vehicle to overtake the preceding vehicle (overtaking target vehicle), a switch for self-driving control to cooperatively perform all these controls, a switch for setting a vehicle speed, an inter-vehicle distance, an inter-vehicle time, and a limited speed which are required for each control, or a switch for releasing each control.

For instance, the engine control device 21 is a known control unit which performs main control on a vehicle engine (not illustrated) such as fuel injection control, ignition timing control, and control for an electronic control throttle valve, based on an intake air amount, a throttle position, an engine coolant temperature, an intake air temperature, oxygen concentration, a crank angle, an accelerator position, and other vehicle information items. In addition, for instance, the engine control device 21 is configured to perform known traction control for decreasing a drive force (decreasing a drive torque) so that a tire slippage rate reaches a preset target slippage rate, in a case where predetermined slippage occurs in drive wheels. In a self-driving state, in a case where an acceleration (requested acceleration) required for each self-driving control described above (control for preventing collision with obstacles, constant speed travel control, following travel control, lane keeping control, lane deviation preventing control, and additionally overtaking control) is input from the travel controller 10, the engine control device 21 calculates a drive torque (self-driving request torque), based on the requested acceleration, and performs engine control in which the self-driving request torque is set to a target torque.

For instance, the brake control device 22 may be a known control unit which can control a brake device (not illustrated) of four wheels independently of a driver's brake operation, based on a brake switch, a wheel speed of the four wheels, a steering angle, a yaw rate, other vehicle information items. The brake control device 22 performs a yaw brake control to control a yaw moment added to the vehicle such as known ABS control and a sideslip prevention control that controls the turning motion of the vehicle by adding the yaw moment to the vehicle due to a braking/driving force difference between the respective wheels. In one example, the brake control device 22 may serve as a second unstable behavior reducer In addition, in a self-driving state, in a case where a deceleration (requested deceleration) required for each self-driving control described above (control for preventing collision with obstacles, constant speed travel control, following travel control, lane keeping control, lane deviation preventing control, and additionally overtaking control) is input from the travel controller 10, the brake control device 22 sets target fluid pressure of a wheel cylinder of each wheel brake, based on the requested deceleration, and performs brake control.

For instance, the steering control device 23 is a known control device which controls an assist torque generated by an electric power steering motor (not illustrated) disposed in a vehicle steering system, based on a vehicle speed, a steering torque, a steering angle, a yaw rate, and other vehicle information items. In addition, the steering control device 23 can perform a lane keeping control for travel control in which the above-described travel lane is maintained as the set lane, lane deviation preventing control to prevent the vehicle from deviating from the travel lane, and self-driving steering control to cooperatively perform these controls. A steering angle or a steering torque required for the lane keeping control, the lane deviation preventing control, and the self-driving steering control is calculated by the travel controller 10, and is input to the steering control device 23. In accordance with an input controlled variable, the electric power steering motor is controlled and driven.

For instance, the display device 24 is a device which gives a visual warning or notice to a driver, such as a monitor, a display, or an alarm lamp. In addition, the speaker/buzzer 25 is a device which gives an auditory warning or notice to a driver.

Based on each input signal from the above-described respective devices 11 to 16, the travel controller 10 performs the self-driving control by cooperatively performing the control for preventing collision with obstacles, the constant speed travel control, the following travel control, the lane keeping control, the lane deviation preventing control, and additionally the overtaking control. In the self-driving state, the travel controller 10 detects the unstable behavior in at least one of the rolling direction or the yaw direction of the vehicle and detects a state in which the driver holds the steering wheel. The travel controller 10 executes at least one of the correction of the steering angle or the selection of a predetermined wheel and the addition of the braking force to the selected wheel according to the detection results of the unstable behavior of the vehicle and the steering wheel holding state of the driver, to thereby reduce the unstable behavior of the vehicle. In one example, the travel controller 10 is may serve as an "unstable behavior detector", a "steering wheel holding state detector", a "first unstable behavior reducer", a "second unstable behavior reducer", and a "vehicle behavior controller".

Figure 2:
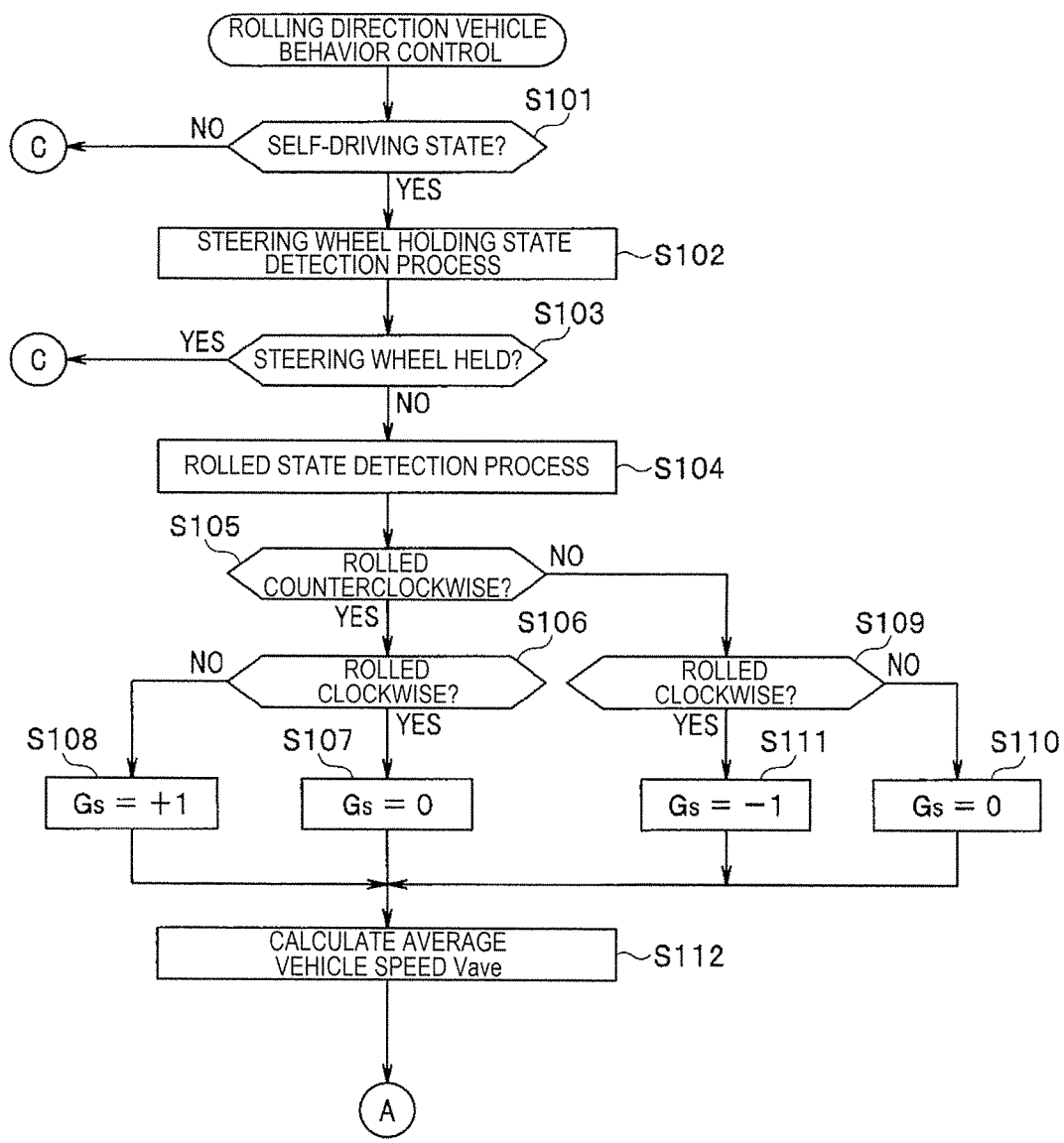
FIG. 2 is a flowchart of a rolling direction vehicle behavior control program in a self-driving control according to the example of the present invention.
Figure 3:
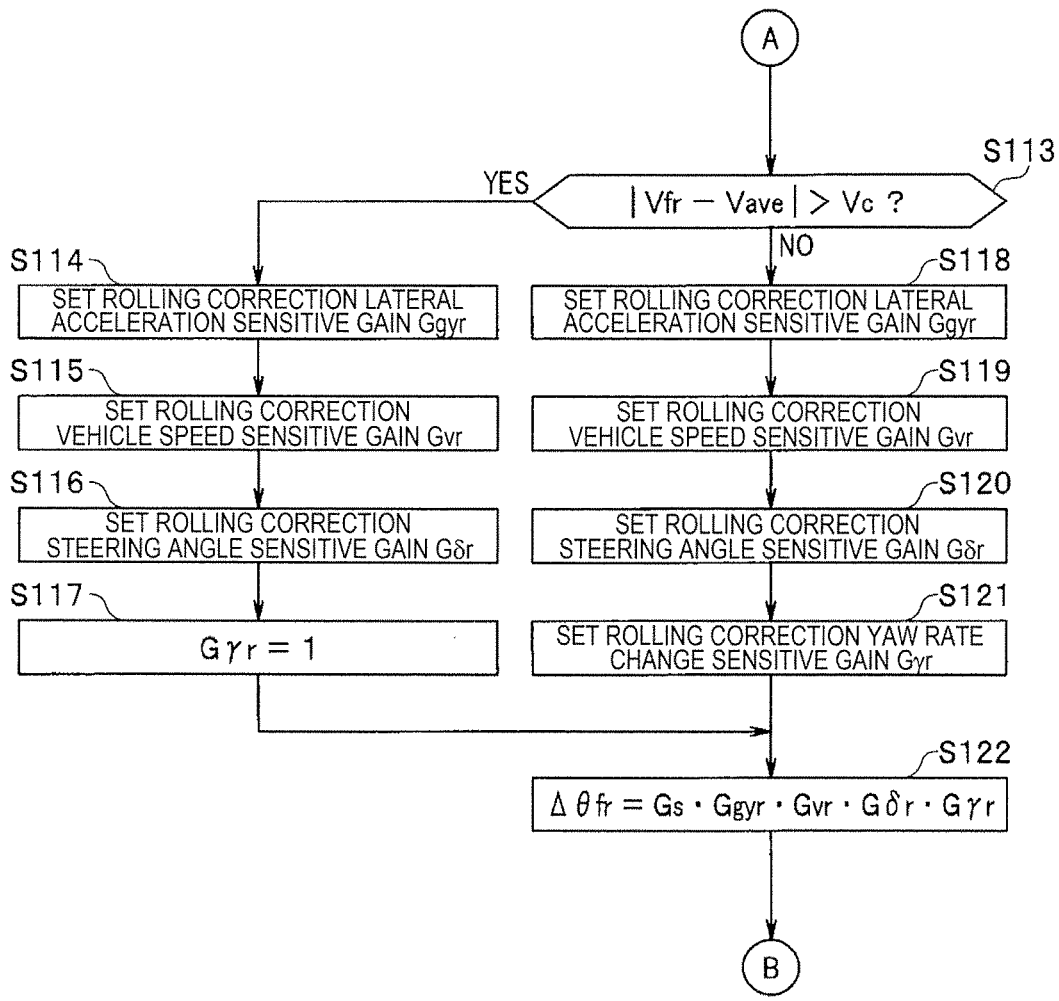
FIG. 3 is a flowchart continued from FIG. 2.
Figure 4:
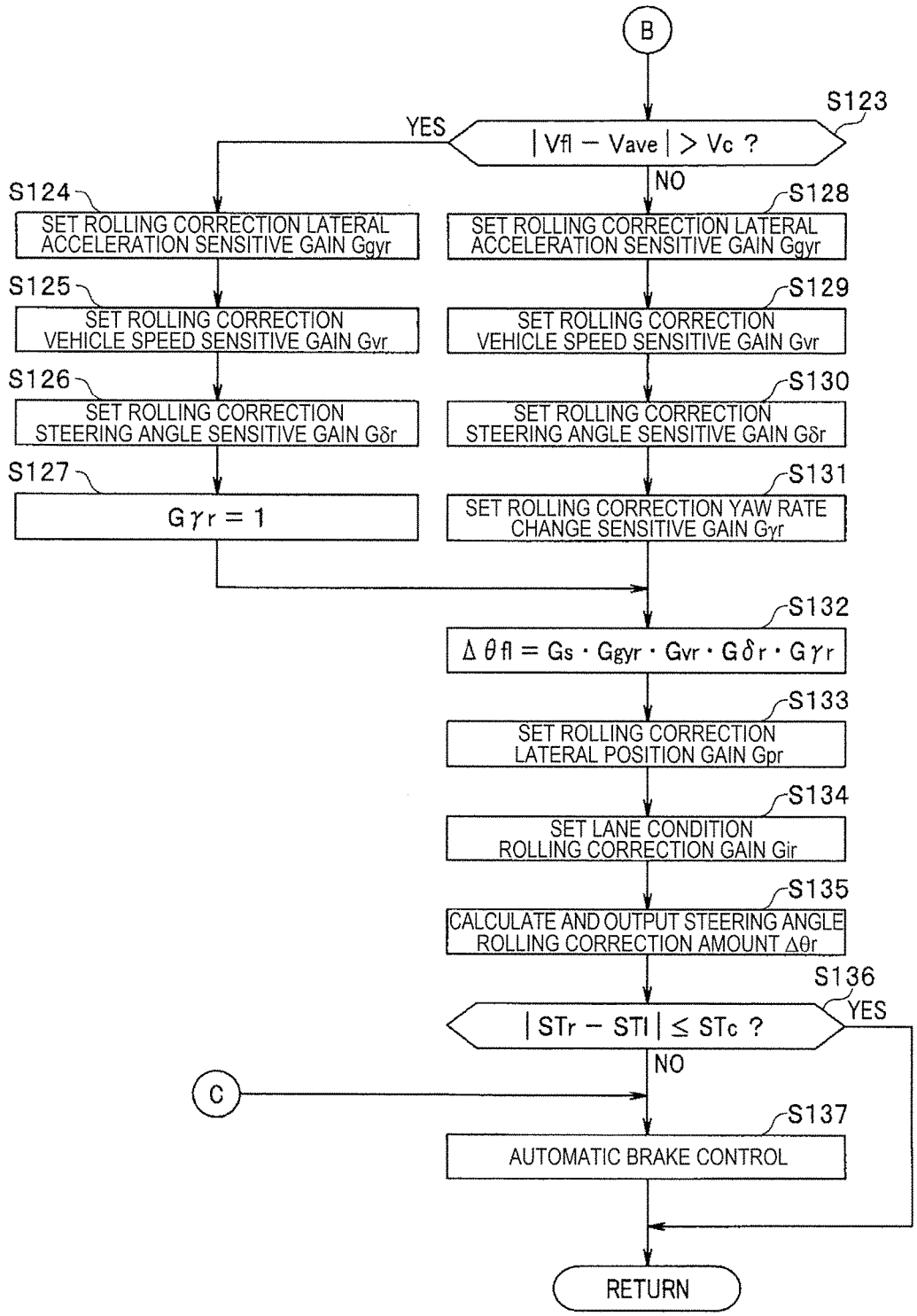
FIG. 4 is a flowchart continued from FIG. 3.

Next, a rolling direction vehicle behavior control program in the self-driving control to be executed by the travel controller 10 will be described with reference to FIGS. 2 to 4.

First, in Step (hereinafter abbreviated as "S") 101, it is determined whether the vehicle is in the self-driving state. If the vehicle is not in the self-driving state, the program proceeds to the automatic brake control in S137 to be described later. If the vehicle is in the self-driving state, the program proceeds to S102.

When the program has proceeded to S102, a process of detecting the steering wheel holding state of the driver is executed. Specifically, when a steering torque exceeds a threshold value set in advance through experiment, calculation, or the like, it is determined that the driver holds the steering wheel. Alternatively, when it is detected that the steering torque exceeds the threshold value set in advance through the experiment, the calculation, or the like, and as a result of frequency analysis of the steering, steering is performed at a frequency equal to or higher than the frequency set in advance by the experiment, the calculation, or the like, it is determined that the driver holds the steering wheel.

Next, in S103, it is determined whether the driver holds the steering wheel. If the driver holds the steering wheel, the program proceeds to the automatic brake control in S137 to be described later. If the driver does not hold (releases) the steering wheel, the program proceeds to S104.

Upon proceeding to S104, based on a front right suspension stroke STr detected by a front right suspension stroke sensor and a front left suspension stroke STl detected by a front left suspension stroke sensor, the determination of a rolling direction and a steering direction is executed as follows. *If STr>STc and STr−STl>ΔSTc are met, since the rolling is carried out counterclockwise and a turning inner side is on the right, it is determined that the vehicle is in a right (hereinafter referred to as "−" in sign) steering state. In this case, STc and ΔSTc are the threshold values set in advance through the experiment, the calculation, and the like. *If STl>ΔSTc and STl−STr>ΔSTc are met, it is determined that the rolling is carried out clockwise and the turning inner side is on the left, it is determined that the vehicle is in a left (hereinafter referred to as "+" in sign) steering state.

Next, in S105, it is determined whether the rolling is carried out counterclockwise. If the roll is rotated counterclockwise, the program proceeds to S106, where it is determined whether the rolling is carried out clockwise.

As a result of the determination in S106, if it is determined that the rolling is carried out clockwise (in other words, if it is determined that the rolling is carried out clockwise in S106 despite being determined as counterclockwise in S105), the program proceeds to S107. In S107, a rolling correction execution gain Gs is set to "0" so as to perform no rolling correction, and the program proceeds to S112. In other words, the rolling correction execution gain Gs is a gain that is multiplied by a correction angle to determine a direction of the correction angle, which will be described later.

As a result of the determination in S106, if it is determined that the rolling is not carried out clockwise, the program proceeds to S108, the rolling correction execution gain Gs is set to "+1", and the program proceeds to S112.

On the other hand, as a result of the determination in S105 described above, if it is determined that the rolling is not carried out counterclockwise (in other words, it is determined to be carried out clockwise), the program proceeds to S109, where it is determined whether the rolling is carried out clockwise.

If it is determined that the rolling is not carried out clockwise in S109 (in other words, if it is determined that the rolling is not carried out clockwise in S109 despite being determined as counterclockwise in S105), the program proceeds to S110. In S110, the rolling correction execution gain Gs is set to "0" so as to perform no rolling correction, and the program proceeds to S112.

Conversely, if it is determined that the rolling is carried out clockwise in S109, the program proceeds to S111, the rolling correction execution gain Gs is set to "−1", and the program proceeds to S112.

In S107, S108, S110, and S111, the rolling correction execution gain Gs is set and the program proceeds to S112, where an average vehicle speed Vave (=(Vfr+Vfl)/2) is calculated according to the right front wheel speed Vfr detected by the right front wheel speed sensor and the left front wheel speed Vfl detected by the left front wheel speed sensor.

Thereafter, the program proceeds to S113, and an absolute value |Vfr—Vave| of a value obtained by subtracting the average vehicle speed Vave from the right front wheel speed Vfr is compared with a threshold value Vc previously set by experiment, calculation, or the like for the right front wheel.

As a result of the comparison, if |Vfr—Vave|>Vc is met, it is determined that the right front wheel is floating and the program proceeds to S114 to S117. If |Vfr—Vave|≤Vc is met, it is determined that the right front wheel is in a grounded state, and the program proceeds to S118 to S121.

First, if it is determined that the right front wheel is floating under the condition of |Vfr—Vave|>Vc, the program proceeds to S114, and a rolling correction lateral acceleration sensitive gain Ggyr is set.

Figure 7:
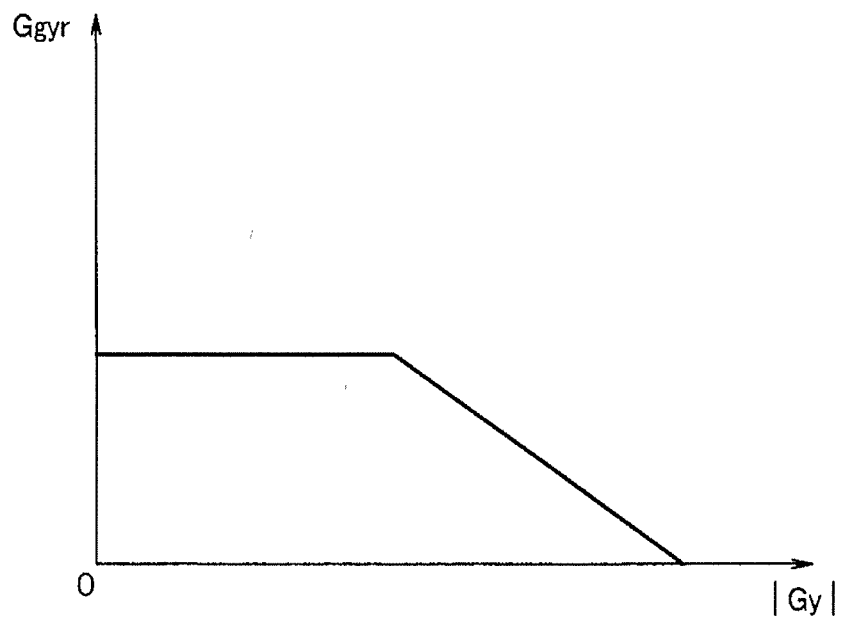
FIG. 7 is a diagram illustrating an instance of a characteristic of a rolling correction lateral acceleration sensitive gain according to the example of the present invention.

As illustrated in FIG. 7, for example, the rolling correction lateral acceleration sensitive gain Ggyr is set by a map or the like through experiment or calculation in advance so that the correction value decreases more as the absolute value |Gy| of the actual lateral acceleration detected by the lateral acceleration sensor increases more.

After S114, the program proceeds to S115 and a rolling correction vehicle speed sensitive gain Gvr is set.

Figure 8:
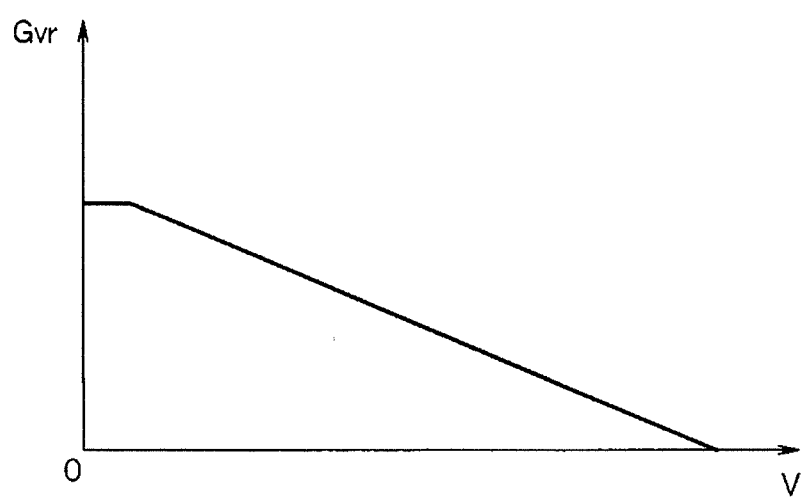
FIG. 8 is a diagram illustrating an instance of a characteristic of a rolling correction vehicle speed sensitive gain according to the example of the present invention.

As illustrated in FIG. 8, for example, the rolling correction vehicle speed sensitive gain Gvr is set by the map or the like through the experiment or the calculation in advance so that the correction value decreases more as a vehicle speed V detected by a vehicle speed sensor increases more.

After S115, the program proceeds to S116 and a rolling correction steering angle sensitive gain Gδr is set.

Figure 9:
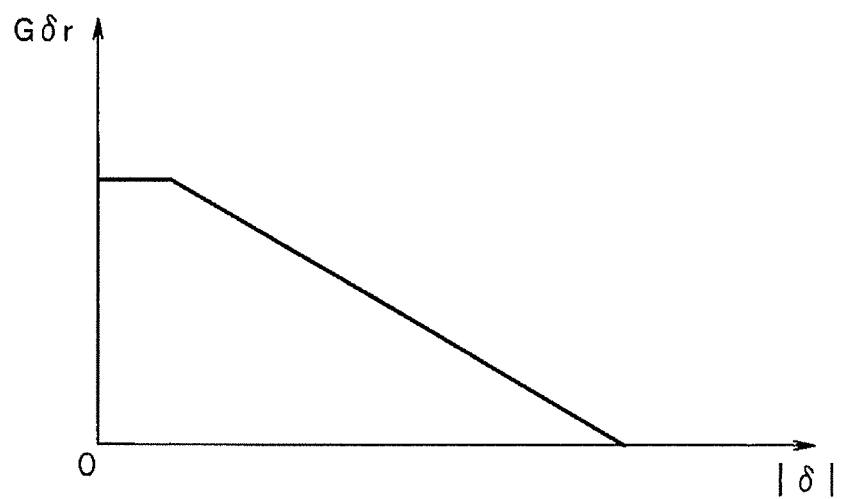
FIG. 9 is a diagram illustrating an instance of a characteristic of a rolling correction steering angle sensitive gain according to the example of the present invention.

As illustrated in FIG. 9, for example, the rolling correction steering angle sensitive gain Gδr is set by a map or the like through experiment or calculation in advance so that the correction value decreases more as an absolute value |δ| of an actual steering angle detected by a steering angle sensor increases more.

After S116, the program proceeds to S117 and a rolling correction yaw rate sensitive gain Gγr is set. In this case, since it is determined that the right front wheel is floating in S113 described above, it is conceivable that there is no problem regardless of a variation of the yaw rate from a ground road surface, and therefore Gγr=1 is set.

On the other hand, when it is determined that |Vfr−Vave|≤Vc is met, it is determined that the right front wheel is in a grounded state in S113, and the program proceeds to S118, the rolling correction lateral acceleration sensitive gain Ggyr is set as with S114. The rolling correction lateral acceleration sensitive gain Ggyr is set by a map or the like illustrated in FIG. 7, which is similar to the characteristic described in S114 described above.

Next, the program proceeds to S119, and the rolling correction vehicle speed sensitive gain Gvr is set as with S115. Likewise, the rolling correction vehicle speed sensitive gain Gvr is set by a map or the like illustrated in FIG. 8, which is similar to the characteristic described in S115 described above.

Next, the program proceeds to S120, and the rolling correction steering angle sensitive gain Gδr is set as with S116. Likewise, the rolling correction steering angle sensitive gain Gδr is set by a map or the like illustrated in FIG. 9, which is similar to the characteristic described in S116 described above.

Figure 10A:
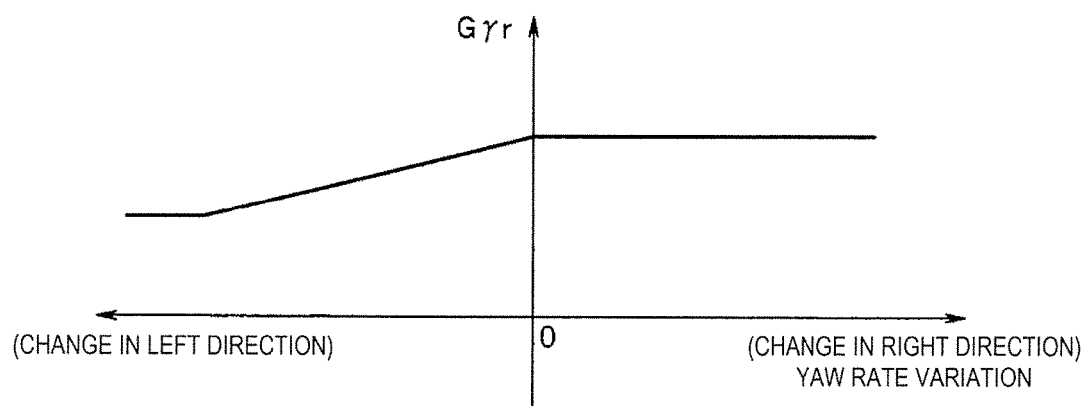
Figure 10B:
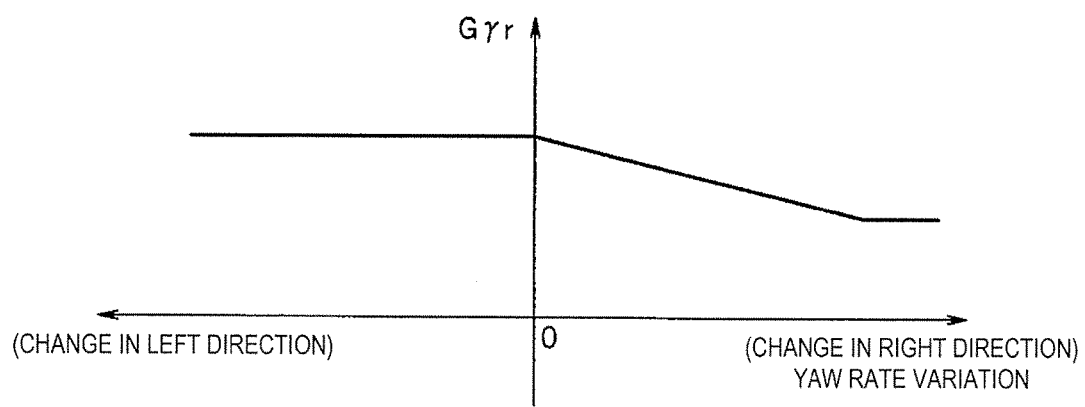

Next, the program proceeds to S121 and the rolling correction yaw rate sensitive gain Gγr is set. In this case, since it is determined that the right front wheel is in contact with the ground in S113 described above, in view of an influence from the road surface, the rolling correction lateral acceleration sensitive gain Ggyr is set with reference to a map of a substantially symmetric characteristic between a case of left steering (refer to FIG. 10A) and a case of right steering (refer to FIG. 10B). In other words, when the yaw rate changes in a direction of corrective steering, the rolling correction lateral acceleration sensitive gain Gγr is set to decrease more as a change in the yaw rate increases more in the corrective steering direction. In an example of FIG. 10A, in the case of steering to the left, when the yaw rate changes to the left, the rolling correction yaw rate change sensitive gain Gγr is set to decrease more as the change in the yaw rate increases more in that direction. Conversely, in an example of FIG. 10B, in the case of steering to the right, when the yaw rate changes in the right direction, the rolling correction yaw rate change sensitive gain Gγr is set to decrease more as the yaw rate change increases more in that direction.

After the rolling correction lateral acceleration sensitive gain Ggyr, the rolling correction vehicle speed sensitive gain Gvr, the roll correction steering angle sensitive gain Gδr, and the rolling correction yaw rate change sensitive gain Gγr have been set in S114 to S117 or S118 to S121 described above, the program proceeds to S122. A corrected steering angle Δθfr corresponding to a rolling situation of the right front wheel is calculated by the following Expression (1), for example.

$$\Delta\theta fr = Gs \cdot Ggyr \cdot Gvr \cdot G\delta r \cdot G\gamma r \quad (1)$$

Thereafter, the program proceeds to S123, and an absolute value |Vfl−Vave| of a value obtained by subtracting the average vehicle speed Vave from the left front wheel speed Vfl is compared with a threshold value Vc previously set by experiment, calculation, or the like for the left front wheel.

As a result of the comparison, if |Vfl−Vave|>Vc is met, it is determined that the left front wheel is floating and the program proceeds to S124 to S127. If |Vfl−Vave|≤Vc is met, it is determined that the left front wheel is in a grounded state, and the program proceeds to S128 to S131.

First, if it is determined that the left front wheel is floating under the condition of |Vfl−Vave|>Vc, the program proceeds to S124, and the rolling correction lateral acceleration sensitive gain Ggyr is set as with S114. The rolling correction lateral acceleration sensitive gain Ggyr is set by a map or the like illustrated in FIG. 7, which is similar to the characteristic described in S114 described above.

Next, the program proceeds to S125, and the rolling correction vehicle speed sensitive gain Gvr is set as with S115. Likewise, the rolling correction vehicle speed sensitive gain Gvr is set by a map or the like illustrated in FIG. 8, which is similar to the characteristic described in S115 described above.

Next, the program proceeds to S126, and the rolling correction steering angle sensitive gain Gδr is set as with S116. Likewise, the rolling correction vehicle speed sensitive gain Gδr is set by a map or the like illustrated in FIG. 9, which is similar to the characteristic described in S116 described above.

Next, the program proceeds to S127 and the rolling correction yaw rate sensitive gain Gγr is set.

Likewise, in S127, as with S117 described above, since it is determined that the left front wheel is floating in S123 described above, it is conceivable that there is no problem regardless of a variation of the yaw rate from a ground road surface, and therefore Gγr=1 is set.

On the other hand, when it is determined that |Vfl−Vave|≤Vc is met, it is determined that the left front wheel is in a grounded state in S123, and the program proceeds to S128, a rolling correction lateral acceleration sensitive gain Ggyr is set as with S114. The rolling correction lateral acceleration sensitive gain Ggyr is set by a map or the like illustrated in FIG. 7, which is similar to the characteristic described in S114 described above.

Next, the program proceeds to S129, and the rolling correction vehicle speed sensitive gain Gvr is set as with S115. Likewise, the rolling correction vehicle speed sensitive gain Gvr is set by a map or the like illustrated in FIG. 8, which is similar to the characteristic described in S115 described above.

Next, the program proceeds to S130, and the rolling correction steering angle sensitive gain Gδr is set as with S116. Likewise, the rolling correction steering angle sensitive gain Gδr is set by a map or the like illustrated in FIG. 9, which is similar to the characteristic described in S116 described above.

Next, the program proceeds to S131 and the rolling correction yaw rate sensitive gain Gγr is set. In this case, since it is determined that the left front wheel is in contact with the ground in S123 described above, as with S121 described above, from the viewpoint of an influence from the road surface, the rolling correction lateral acceleration sensitive gain Ggyr is set with reference to a map of a substantially symmetric characteristic between a case of left steering (refer to FIG. 10A) and a case of right steering (refer to FIG. 10B).

After the rolling correction lateral acceleration sensitive gain Ggyr, the rolling correction vehicle speed sensitive gain Gvr, the roll correction steering angle sensitive gain Gδr, and the rolling correction yaw rate change sensitive gain Gγr have been set in S124 to S127 or S128 to S131 described above, the program proceeds to S132. A corrected steering angle Δθfl corresponding to a rolling situation of the left front wheel is calculated by the following Expression (2), for example.

$$\Delta\theta fl = Gs \cdot Ggyr \cdot Gvr \cdot G\delta r \cdot G\gamma r \quad (2)$$

Next, the program proceeds to S133 and a rolling correction lateral position gain Gpr is set.

Figure 11A:
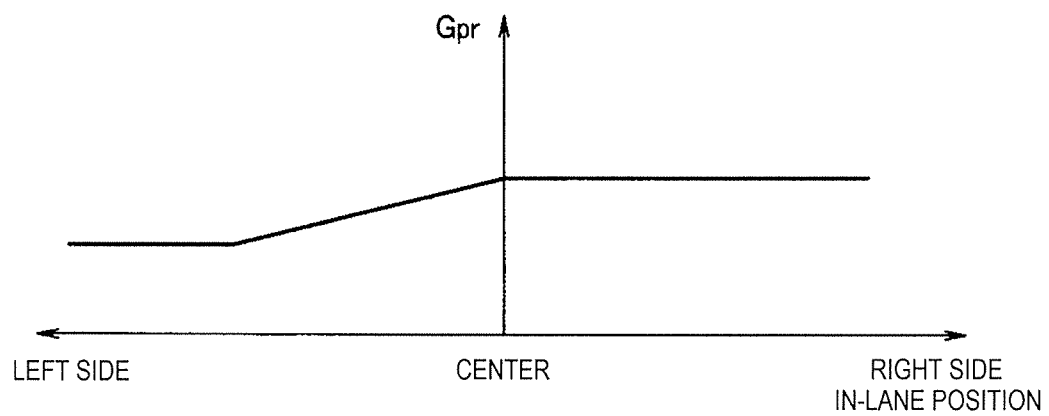

As illustrated in FIG. 11, the rolling correction lateral position gain Gpr is set according to the steering direction and the lateral position in the width direction within a lane of the vehicle which is obtained from image information of the surrounding environment recognition device 11 with reference to a map obtained through experiment, calculation, or the like in advance.

Figure 11B:
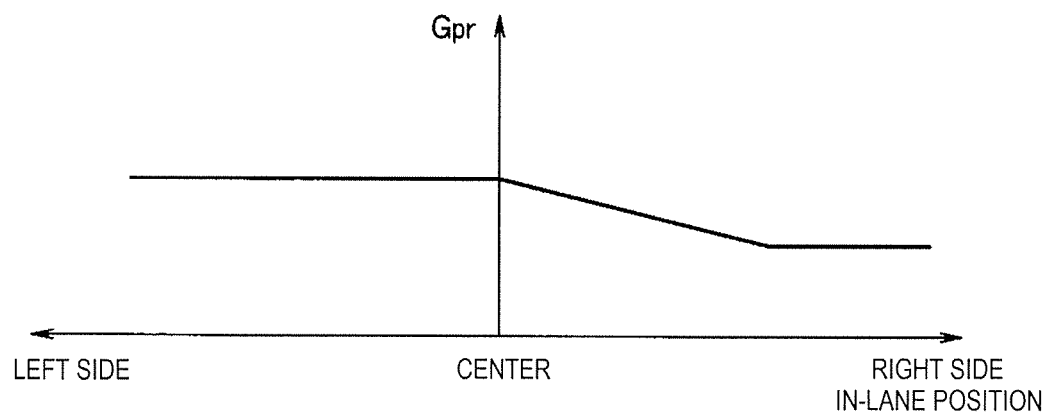

Specifically, the rolling correction lateral position gain Gpr is set to a map of a characteristic substantially symmetrical about a lane center as a center axis between the case of the left steering (refer to FIG. 11A) and the case of the right steering (refer to FIG. 11B). In the case of the left steering (refer to FIG. 11A), in order to prevent a lane deviation from a left lane marking line by the corrective steering, the rolling correction lateral position gain Gpr is set to be small so that the corrective steering becomes smaller as the vehicle travels closer to the left. Likewise, in the case of the right steering (refer to FIG. 11B), in order to prevent the lane deviation from a right lane marking line by the corrective steering, the rolling correction lateral position gain Gpr is set to be small so that the corrective steering becomes smaller as the vehicle travels closer to the right.

After the rolling correction lateral position gain Gpr has been set in S133, the program proceeds to S134, and a lane condition rolling correction gain Gir is set.

Figure 12A:
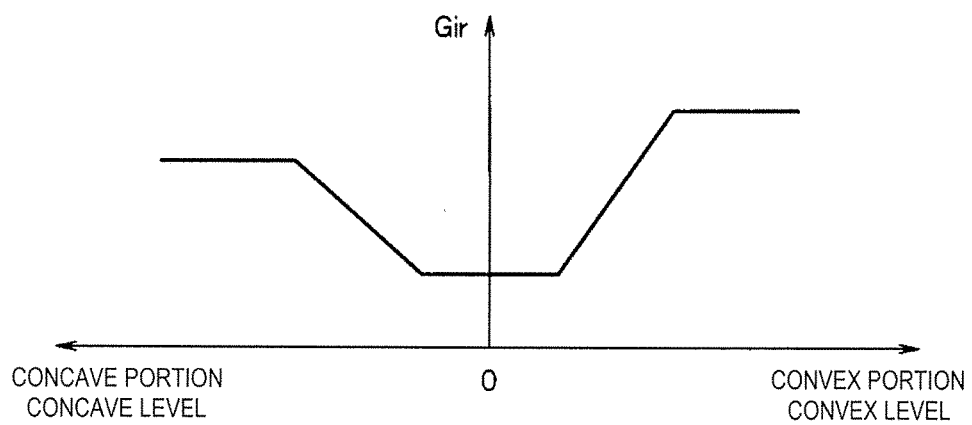
Figure 12B:
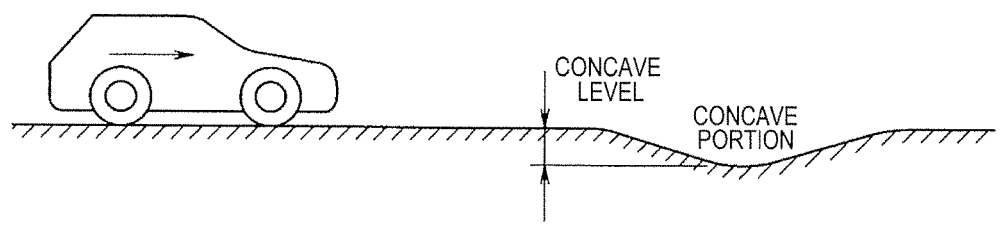
Figure 12C:
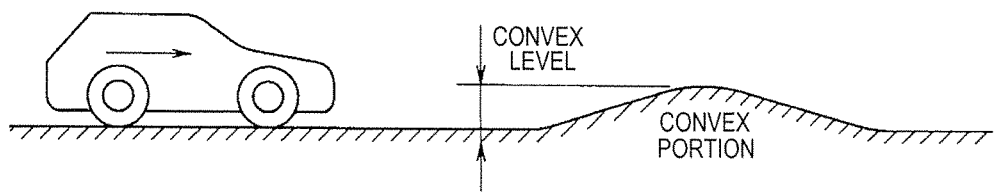

As illustrated in FIGS. 12A to 12C, the lane condition rolling correction gain Gir is set according to an unevenness condition in a forward gaze distance (for example, a distance of (vehicle speed× set time)) of a traveling path which is obtained from image information of the surrounding environment recognition device 11 with reference to a map (FIG. 12A) obtained through experiment, calculation, or the like in advance.

In other words, rolling is likely to occur in a portion where a road surface is recessed (FIG. 12B) or a portion where the road surface protrudes (FIG. 12C). More particularly, in the portion where the road surface protrudes, as compared with the portion where the road surface is recessed, because it is conceivable that large rolling may occur due to a direct influence of the protruding road surface rising, the lane condition rolling correction gain Gir is set to a large value.

After the lane condition rolling correction gain Gir has been set in S134, the program proceeds to S135 in which the steering angle rolling correction amount $\Delta\theta r$ is calculated by, for example, the following Expression (3), and output to the steering control device 23 to correct the current steering angle.

At the time of right correction steering angle, $$\Delta\theta r = Gpr \cdot Gir \cdot (\Delta\theta fr) \quad (3)$$

At the time of left correction steering angle, $$\Delta\theta r = Gpr \cdot Gir \cdot (\Delta\theta fl) \quad (3)$$

Thereafter, the program proceeds to S136, in which it is determined whether the unstable behavior in the rolling direction of the vehicle converges, for example, by the following Expression (4).

$$|STr - STl| \leq STc \quad (4)$$

In this example, STc is a convergence determination value of the rolling direction vehicle behavior obtained through experiment, calculation, or the like in advance.

If Expression (4) described above is established and it can be determined that the vehicle unstable behavior in the rolling direction converges, the program exits.

Conversely, in the case where Expression (4) described above is not established and it is determined that the vehicle unstable behavior in the rolling direction does not converge, the program proceeds to S137, and the automatic brake control is executed to exit the program.

In the present example, in order to calculate the steering angle rolling correction amount $\Delta\theta r$ for correcting the vehicle unstable behavior in the rolling direction, the rolling correction lateral acceleration sensitive gain Ggyr, the rolling correction vehicle speed sensitive gain Gvr, the rolling correction steering angle sensitive gain G$\delta$r, the rolling correction yaw rate change sensitive gain G$\gamma$r, the rolling correction lateral position gain Gpr, and the lane condition rolling correction gain Gir are used. However, the steering angle rolling correction amount $\Delta\theta r$ may be obtained with the selective use of any one or multiple gains of those gains without the use of all those gains to obtain the steering angle rolling correction amount $\Delta\theta r$.

Figure 5:
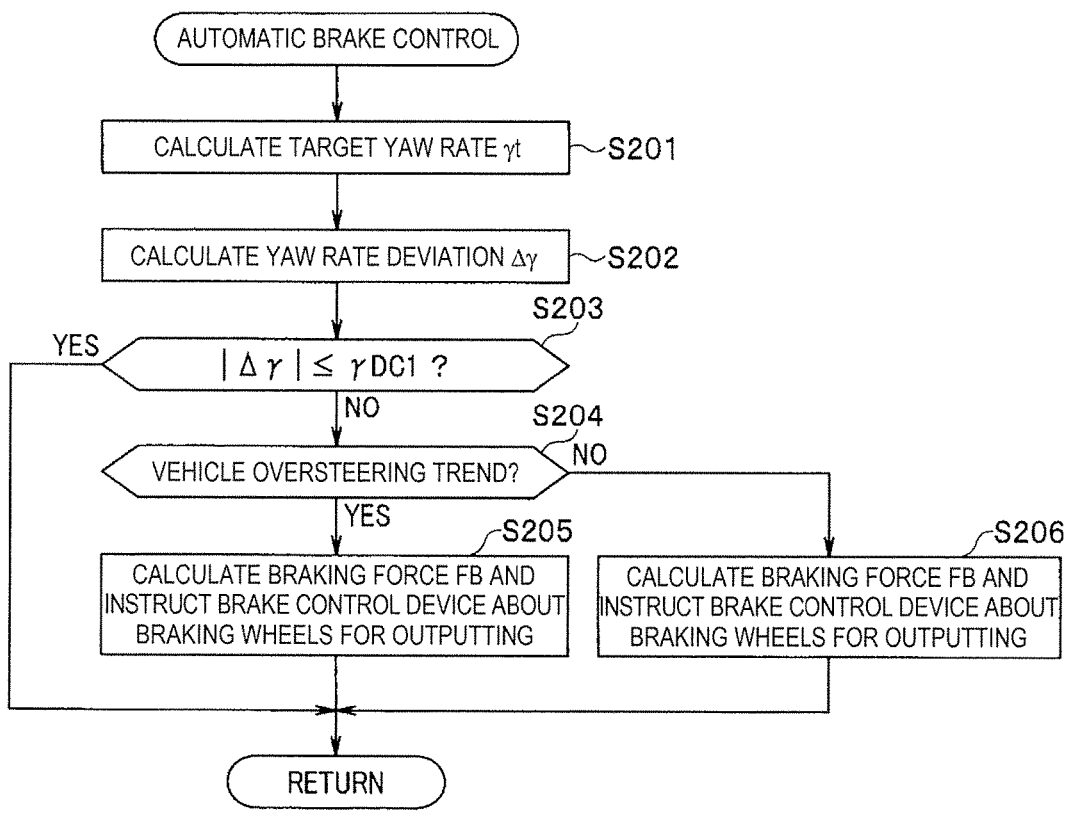
FIG. 5 is a flowchart of an automatic brake control program according to the example of the present invention.

Next, the automatic brake control program executed in S137 will be described with reference to a flowchart in FIG. 5.

First, in S201, a target yaw rate $\gamma t$ is calculated according to a motion model of the vehicle through, for example, the following Expression (5).

$$\gamma t = (1/(1+T \cdot s)) \cdot G\gamma\delta \cdot \delta \quad (5)$$

In this expression, T is a time constant, s is a Laplace operator, and G$\gamma\delta$ is a yaw rate steady state gain, and the time constant T and the yaw rate steady state gain G$\gamma\delta$ are calculated by the following Expressions (6) and (7), for example.

$$T = (m \cdot Lf \cdot V)/(2 \cdot L \cdot CPr) \quad (6)$$

$$G\gamma\delta = 1/(1+A0 \cdot V^2) \cdot V/L \quad (7)$$

In this example, m is a vehicle mass, Lf is a distance between a front axle and the center of gravity, L is a wheel base, CPr is a rear equivalent cornering power, and A0 is a vehicle specific stability factor.

Next, the program proceeds to S202, and a yaw rate deviation $\Delta\gamma$ is calculated from the following Expression (8).

$$\Delta\gamma = \gamma - \gamma t \quad (8)$$

Next, the program proceeds to S203, and it is determined whether an absolute value $|\Delta\gamma|$ of the yaw rate deviation is less than or equal to a threshold value $\gamma Dc1$ ($|\Delta\gamma| \leq \gamma Dc1$) obtained by experiment, calculation, or the like in advance. The $\gamma Dc1$ is a threshold value of a dead zone for determining whether to add a yaw moment to the vehicle. In the case of $|\Delta\gamma| \leq \gamma Dc1$, it is determined that the current vehicle behavior is almost a neutral steering trend, and there is no need to add the yaw moment to the vehicle, and the program exits.

In the case of $|\Delta\gamma| > \gamma Dc1$, the process proceeds to S204, in which it is determined whether the vehicle shows an oversteering trend. In the present example, for example, an absolute value $|\gamma t|$ of the target yaw rate is compared with an absolute value $|\gamma|$ of an actual yaw rate to determine whether to show the oversteering trend. If the absolute value $|\gamma t|$ of the target yaw rate is smaller than the absolute value of the actual yaw rate $|\gamma|$, it is determined that the vehicle is in the oversteering trend. If it is determined that the oversteering is established with $|\gamma t| < |\gamma|$, the program proceeds to S205 in which, for example, a braking force FB is calculated according to the yaw rate deviation $\Delta\gamma$, turning outer wheels are selected, and a braking force corresponding to the detected rolling angle and the vehicle speed is calculated, and the brake control device 22 is instructed to add the braking force to the selected wheels.

If it is determined in S204 that oversteering is not established with |γt|<|γ|, in other words, the vehicle is in the understeering trend, the program proceeds to S206 in which, for example, the braking force FB is calculated according to the yaw rate deviation Δγ, turning inner wheels are selected, and a braking force corresponding to the detected rolling angle and the vehicle speed is calculated, and the brake control device 22 is instructed to add the braking force to the selected wheels.

Figure 6:
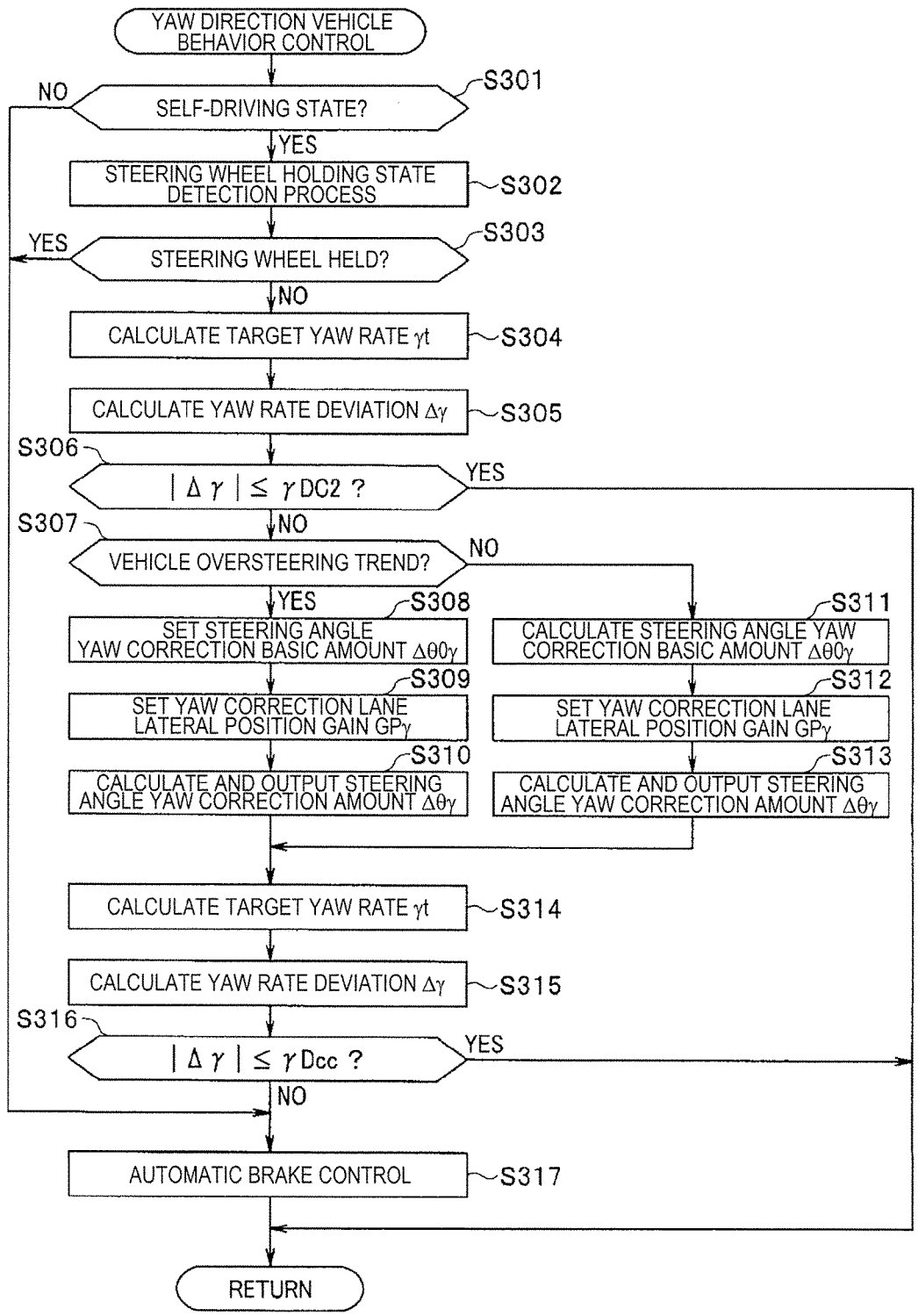
FIG. 6 is a flowchart of a yaw direction vehicle behavior control program in the self-driving control according to the example of the present invention.

Next, a yaw direction vehicle behavior control program in the self-driving control to be executed by the travel controller 10 will be described with reference to FIG. 6.

First, in S301, it is determined whether the vehicle is in the self-driving state. If the vehicle is not in the self-driving state, the program proceeds to the automatic brake control in S137 (as with the rolling direction vehicle behavior control program described above). If the vehicle is in the self-driving state, the program proceeds to S302.

The program proceeds to S302, and a process of detecting the steering wheel holding state of the driver (similar to S102 of the rolling direction vehicle behavior control program described above) is executed.

Next, the program proceeds to S303, and it is determined whether the driver holds the steering wheel. If the driver holds the steering wheel, the program proceeds to the automatic brake control in S137 to be described later. If the driver does not hold (releases) the steering wheel, the program proceeds to S304.

The program proceeds to S304, and the target yaw rate γt is calculated, for example, through Expression (5) described above.

Next, the program proceeds to S305, and the yaw rate deviation Δγ is calculated through Expression (8) described above.

Next, the program proceeds to S306, and it is determined whether an absolute value |Δγ| of the yaw rate deviation is less than or equal to a threshold value γDc2 (|Δγ|≤γDc2) obtained by experiment, calculation, or the like in advance. The γDc2 is a threshold value of a dead zone. In the case of |Δγ|≤γDc2, it is determined that the current vehicle behavior is almost a neutral steering trend, and there is no need to add the yaw moment to the vehicle, and the program exits.

In the case of |Δγ|>γDc2, the process proceeds to S307, in which it is determined whether the vehicle is in the oversteering trend. In the present example, for example, as described above, the absolute value |γt| of the target yaw rate is compared with the absolute value |γ| of the actual yaw rate to determine whether to show the oversteering trend. If the absolute value |γt| of the target yaw rate is smaller than the absolute value of the actual yaw rate |γ|, it is determined that the vehicle is in the oversteering trend.

Figure 13:
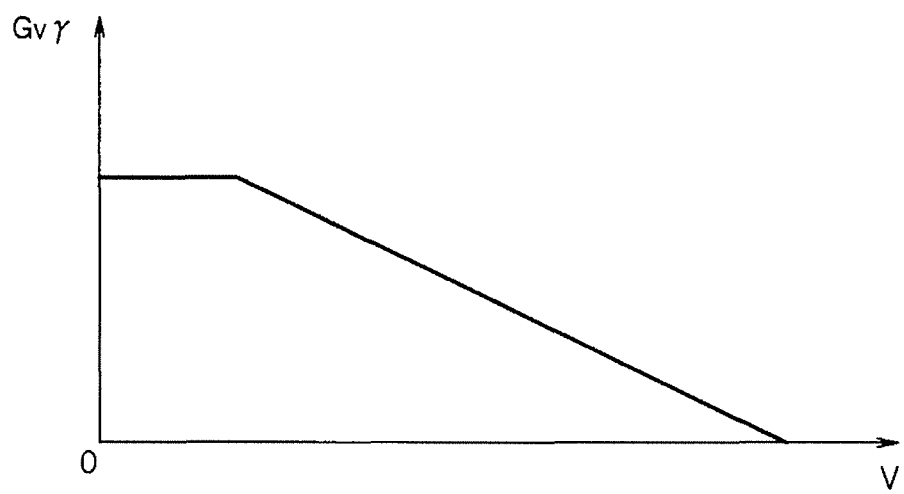
FIG. 13 is a diagram illustrating an instance of a characteristic of a yaw correction vehicle speed sensitive gain according to the example of the present invention.

If it is determined in step S307 that oversteering is established with |γt|<|γ|, the process proceeds to step S308, in which a steering angle yaw correction basic amount Δθ0γ is set. The steering angle yaw correction basic amount Δθ0γ is calculated through the following Expression (9) by setting a yaw correction vehicle speed sensitive gain Gvγ (refer to FIG. 13) with reference to a map corresponding to the vehicle speed set through experiment, calculation, or the like in advance.

$$\Delta\theta 0\gamma = Gv\gamma \cdot |\Delta\gamma| \tag{9}$$

Figure 14:
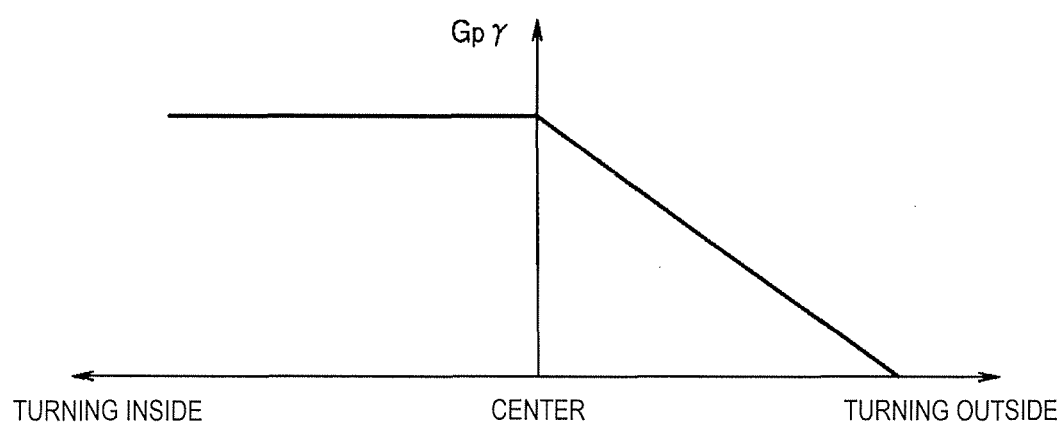
FIG. 14 is a diagram illustrating an instance of a characteristic of a yaw correction lane lateral position gain set at the time of an oversteering trend according to the example of the present invention.
Figure 16:
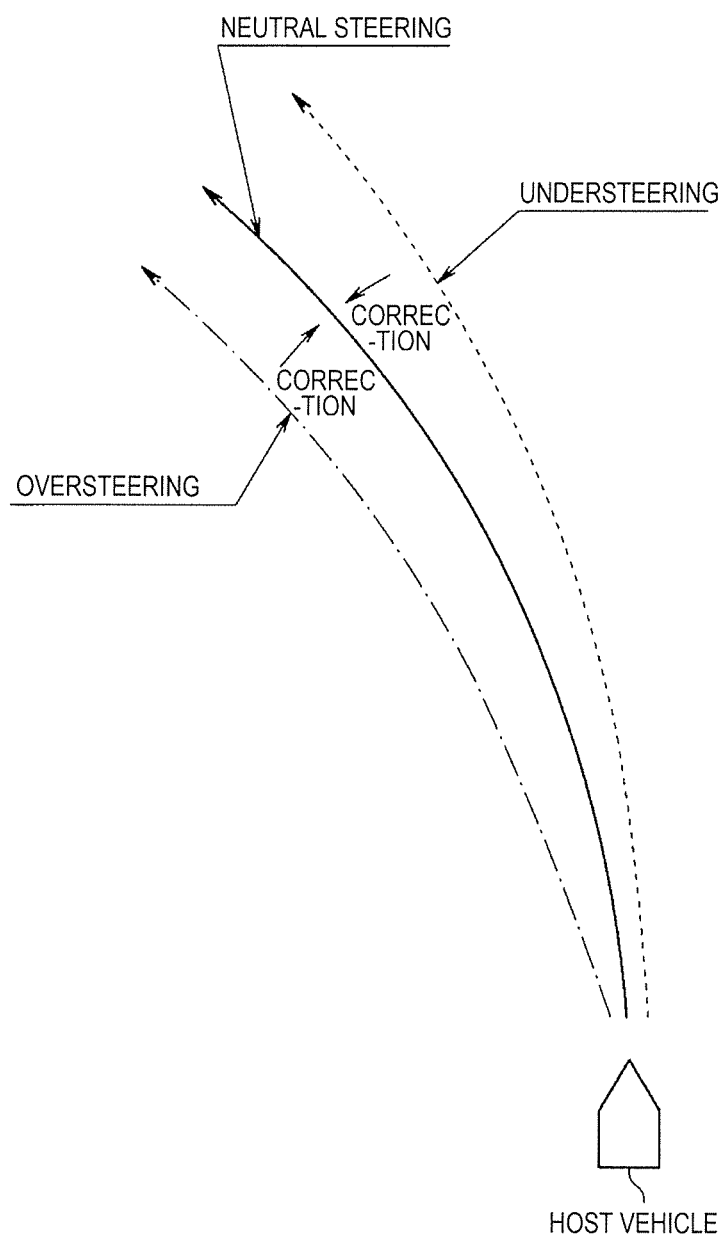
FIG. 16 is an illustrative diagram of the prevention of the oversteering trend and the understeering trend according to the example of the present invention.

Thereafter, the program proceeds to S309, and a yaw correction lane lateral position gain GPγ is set. As illustrated in FIG. 14, the yaw correction lateral position gain GPγ is set according to the lateral position in the width direction within a lane of the vehicle which is obtained from image information of the surrounding environment recognition device 11 with reference to a map obtained through experiment, calculation, or the like in advance. More specifically, in the case of the oversteering trend, when the vehicle is traveling close to the outer side of the turn, in order to prevent the lane deviation from the turning outer side while a correction is made to correct the oversteering trend (refer to oversteering in FIG. 16), a controlled variable is set to be smaller as the vehicle is traveling closer to the outer side of the turning from the lane center.

Then, the program proceeds to S310, a steering angle yaw correction amount Δθγ is calculated, for example, through the following Expression (10), and output to the steering control device 23 in a direction to return the steering angle yaw correction amount Δθγ to correct the present steering angle.

$$\Delta\theta\gamma = GP\gamma \cdot \Delta\theta 0\gamma \tag{10}$$

On the other hand, if it is determined that the oversteering is not established with |γt|>|γ|, that is, the vehicle is in the understeering trend in S307 described above, the program proceeds to S311, and the steering angle yaw correction basic amount Δθ0γ is set. The steering angle yaw correction basic amount Δθ0γ is calculated through Expression (9) described above by setting the yaw correction vehicle speed sensitive gain Gvγ (refer to FIG. 13) with reference to the map corresponding to the vehicle speed set through experiment, calculation, or the like in advance.

Figure 15:
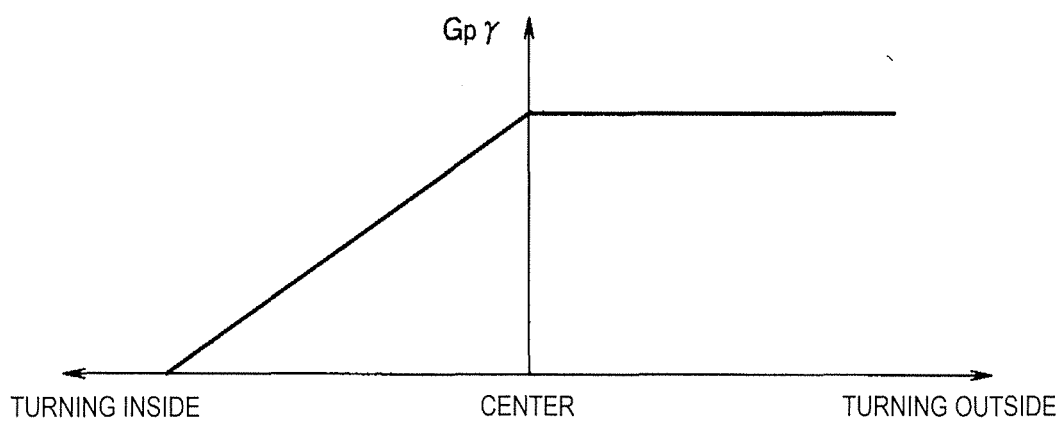
FIG. 15 is a diagram illustrating an instance of a characteristic of a yaw correction lane lateral position gain set at the time of an understeering trend according to the example of the present invention.

Thereafter, the program proceeds to S312, and a yaw correction lane lateral position gain GPγ is set. As illustrated in FIG. 15, the yaw correction lateral position gain GPγ is set according to the lateral position in the width direction within a lane of the vehicle which is obtained from image information of the surrounding environment recognition device 11 with reference to a map obtained through experiment, calculation, or the like in advance. More specifically, in the case of the understeering trend, when the vehicle is traveling close to the inner side of the turn, in order to prevent the lane deviation from the turning outer side while a correction is made to correct the understeering trend (refer to understeering in FIG. 16), a controlled variable is set to be smaller as the vehicle is traveling closer to the inner side of the turning from the lane center.

Then, the program proceeds to S313, a steering angle yaw correction amount Δθγ is calculated, for example, through Expression (10) described above, and output to the steering control device 23 in a direction to increase the steering angle yaw correction amount Δθγ to correct the present steering angle.

After the steering angle yaw correction amount Δθγ has been output to the steering control device 23 in S310 or S313 described above, the program proceeds to S314 and the target yaw rate γt is again calculated from Expression (5) described above.

Next, the program proceeds to S315, and the yaw rate deviation Δγ is calculated through Expression (8) described above.

Next, the program proceeds to S316, and it is determined whether the absolute value |Δγ| of the yaw rate deviation is less than or equal to a threshold value γDcc (|Δγ|≤γDcc) obtained by experiment, calculation, or the like in advance. In this example, the threshold value γDcc is a convergence determination value of the vehicle behavior in the yaw direction which is obtained through experiment, calculation, or the like in advance.

As a result of the determination in S316, if $|\Delta\gamma| \leq \gamma Dcc$ is met, it is determined that the unstable behavior of the vehicle in the yaw direction has converged, and the program exits.

Conversely, in the case where $|\Delta\gamma|\ \gamma Dcc$ is met and it is determined that the vehicle unstable behavior in the yaw direction does not converge, the program proceeds to S137, and the automatic brake control is executed to exit the program.

As has been described above, according to the example of the present invention, in the self-driving state, the unstable behavior in at least one of the rolling direction or the yaw direction of the vehicle is detected, the state of holding the steering wheel by the driver is detected, and at least one of the correction of the steering angle or the selection of the predetermined wheel to add the braking force to the selected wheel is executed, to thereby reduce the unstable behavior of the vehicle. For that reason, in the vehicle equipped with the self-driving function, the driving assistance can be performed so as to reduce the unstable behaviors in the rolling direction and the yaw direction of the vehicle without causing the driver to feel uncomfortable when the driver is steering, and the unstable behaviors of the vehicle can be quickly reduced by operating the optimum actuator for reducing the unstable behaviors when the driver is not steering.

The invention claimed is:

1. A travel control device for a vehicle, the travel control device comprising:
a controller configured to:
detect an unstable behavior in either one or both of a rolling direction and a yaw direction of a vehicle traveling under a self-driving mode;
determine whether a driver of the vehicle is maneuvering a steering wheel of the vehicle traveling under the self-driving mode;
reduce, in response to determining that the driver of the vehicle is not maneuvering the steering wheel of the vehicle traveling under the self-driving mode, the detected unstable behavior of the vehicle by correcting a steering angle of the vehicle; and
reduce, in response to determining that the driver of the vehicle is maneuvering a steering wheel of the vehicle, the detected unstable behavior of the vehicle by selecting a wheel from a set of wheels of the vehicle and applying a braking force to the selected wheel.

2. The travel control device for a vehicle according to claim 1, wherein the controller is further configured to:
when correcting the steering angle of the vehicle fails to reduce the detected unstable behavior of the vehicle, reduce the detected unstable behavior of the vehicle by selecting the wheel from the set of wheels of the vehicle and applying a braking force to the selected wheel.

3. The travel control device for a vehicle according to claim 1, wherein the controller is further configured to:
when the detected unstable behavior of the vehicle is the unstable behavior in the rolling direction, calculate a correction amount of the steering angle according to 1) a rolling rotation, 2) floating and grounding states of the set of wheels, and 3) traveling information of the vehicle.

4. The travel control device for a vehicle according to claim 2, wherein the controller is further configured to:
when the detected unstable behavior of the vehicle is the unstable behavior in the rolling direction, calculate a correction amount of the steering angle according to 1) a rolling rotation, 2) floating and grounding states of the set of wheels, and 3) traveling information of the vehicle.

5. The travel control device for a vehicle according to claim 1, wherein the controller is further configured to:
when the detected unstable behavior of the vehicle is the unstable behavior in the yaw direction, compare a target turning behavior obtained by a vehicle model with an actual turning behavior and calculate a correction amount of the steering angle to allow the target turning behavior and the actual turning behavior to coincide with each other.

6. The travel control device for a vehicle according to claim 2, wherein the controller is further configured to:
when the detected unstable behavior of the vehicle is the unstable behavior in the yaw direction, compare a target turning behavior obtained by a vehicle model with an actual turning behavior and calculate a correction amount of the steering angle to allow the target turning behavior and the actual turning behavior to coincide with each other.

7. The travel control device for a vehicle according to claim 3, wherein
the correction amount of the steering angle is further calculated according to lane information of the vehicle.

8. The travel control device for a vehicle according to claim 4, wherein
the correction amount of the steering angle is further calculated according to lane information of the vehicle.

9. The travel control device for a vehicle according to claim 5, wherein
the correction amount of the steering angle is further calculated according to lane information of the vehicle.

10. The travel control device for a vehicle according to claim 6, wherein
the correction amount of the steering angle is further calculated according to lane information of the vehicle.

* * * * *